United States Patent
Kuth

(10) Patent No.: US 7,461,296 B2
(45) Date of Patent: Dec. 2, 2008

(54) METHOD TO TEST A SOFTWARE SYSTEM FOR TECHNICAL SYSTEMS

(75) Inventor: Rainer Kuth, Herzogenaurach (DE)

(73) Assignee: Siemens Aktiengesellschaft, Munich (DE)

(*) Notice: Subject to any disclaimer, the term of this patent is extended or adjusted under 35 U.S.C. 154(b) by 763 days.

(21) Appl. No.: 10/677,898

(22) Filed: Oct. 2, 2003

(65) Prior Publication Data

US 2004/0153831 A1  Aug. 5, 2004

(30) Foreign Application Priority Data

Oct. 2, 2002 (DE) ................. 102 46 097

(51) Int. Cl.
*G06F 11/00* (2006.01)
(52) U.S. Cl. .................. 714/38; 714/33; 600/300
(58) Field of Classification Search ................. None
See application file for complete search history.

(56) References Cited

U.S. PATENT DOCUMENTS

| | | | | |
|---|---|---|---|---|
| 4,696,003 | A * | 9/1987 | Kerr et al. ................. 714/38 |
| 5,008,814 | A * | 4/1991 | Mathur ...................... 709/221 |
| 5,053,883 | A * | 10/1991 | Johnson ...................... 725/114 |
| 5,109,350 | A * | 4/1992 | Henwood et al. ............ 702/186 |
| 5,335,342 | A * | 8/1994 | Pope et al. .................. 714/38 |
| 5,410,703 | A * | 4/1995 | Nilsson et al. .............. 717/168 |
| 5,488,339 | A * | 1/1996 | Havens et al. .............. 335/216 |
| 5,742,754 | A * | 4/1998 | Tse ........................... 714/38 |
| 5,758,062 | A * | 5/1998 | McMahon et al. ............ 714/38 |
| 5,905,856 | A | 5/1999 | Ottensooser |
| 6,061,643 | A * | 5/2000 | Walker et al. ............... 702/123 |
| 6,237,138 | B1 * | 5/2001 | Hameluck et al. ........... 717/128 |
| 6,564,175 | B1 * | 5/2003 | Hady et al. .................. 702/186 |
| 6,564,371 | B1 * | 5/2003 | Goldman et al. ............ 717/127 |
| 6,587,969 | B1 * | 7/2003 | Weinberg et al. ............. 714/46 |
| 6,681,389 | B1 * | 1/2004 | Engel et al. .................. 717/173 |
| 6,692,258 | B1 * | 2/2004 | Kurzweil et al. ............ 434/262 |
| 6,742,141 | B1 * | 5/2004 | Miller ......................... 714/26 |
| 6,804,796 | B2 * | 10/2004 | Gustavsson et al. .......... 714/38 |
| 6,948,166 | B2 * | 9/2005 | Barfield et al. .............. 717/174 |
| 6,959,433 | B1 * | 10/2005 | Morales et al. .............. 717/127 |
| 6,978,244 | B2 * | 12/2005 | Rovinelli et al. .............. 705/2 |
| 7,099,893 | B2 * | 8/2006 | Bischof et al. ........... 707/104.1 |
| 7,162,724 | B2 * | 1/2007 | Blaser et al. ................ 719/328 |
| 7,340,650 | B2 * | 3/2008 | Westmacott ................. 714/38 |
| 2002/0026630 | A1 | 2/2002 | Schmidt et al. |
| 2002/0059512 | A1 | 5/2002 | Desjardins |
| 2002/0082483 | A1 | 6/2002 | Bungert et al. |
| 2002/0174142 | A1 * | 11/2002 | Demers et al. .............. 707/509 |

(Continued)

FOREIGN PATENT DOCUMENTS

EP         1227398 A2 *    7/2002

*Primary Examiner*—Gabriel L Chu
(74) *Attorney, Agent, or Firm*—Schiff Hardin LLP

(57) ABSTRACT

In a method for testing a software system that operates a technical system including a technical system that is in operation by a customer, an operation model is generated that is based on a reproducible operation procedure under conditions relevant for the customer, and the operation of the technical system is monitored. The software system to be tested on the technical system of the customer is installed, and this technical system is operated and monitored with the operation model. Subsequently the operation of the technical system of the customer is evaluated with the operation model with regard to possible faulty executions.

8 Claims, 1 Drawing Sheet

U.S. PATENT DOCUMENTS

2003/0005426 A1* 1/2003 Scholtens et al. ........... 717/169
2004/0249934 A1* 12/2004 Anderson et al. ........... 709/224
2006/0020915 A1* 1/2006 Lloyd et al. ................. 717/111

* cited by examiner

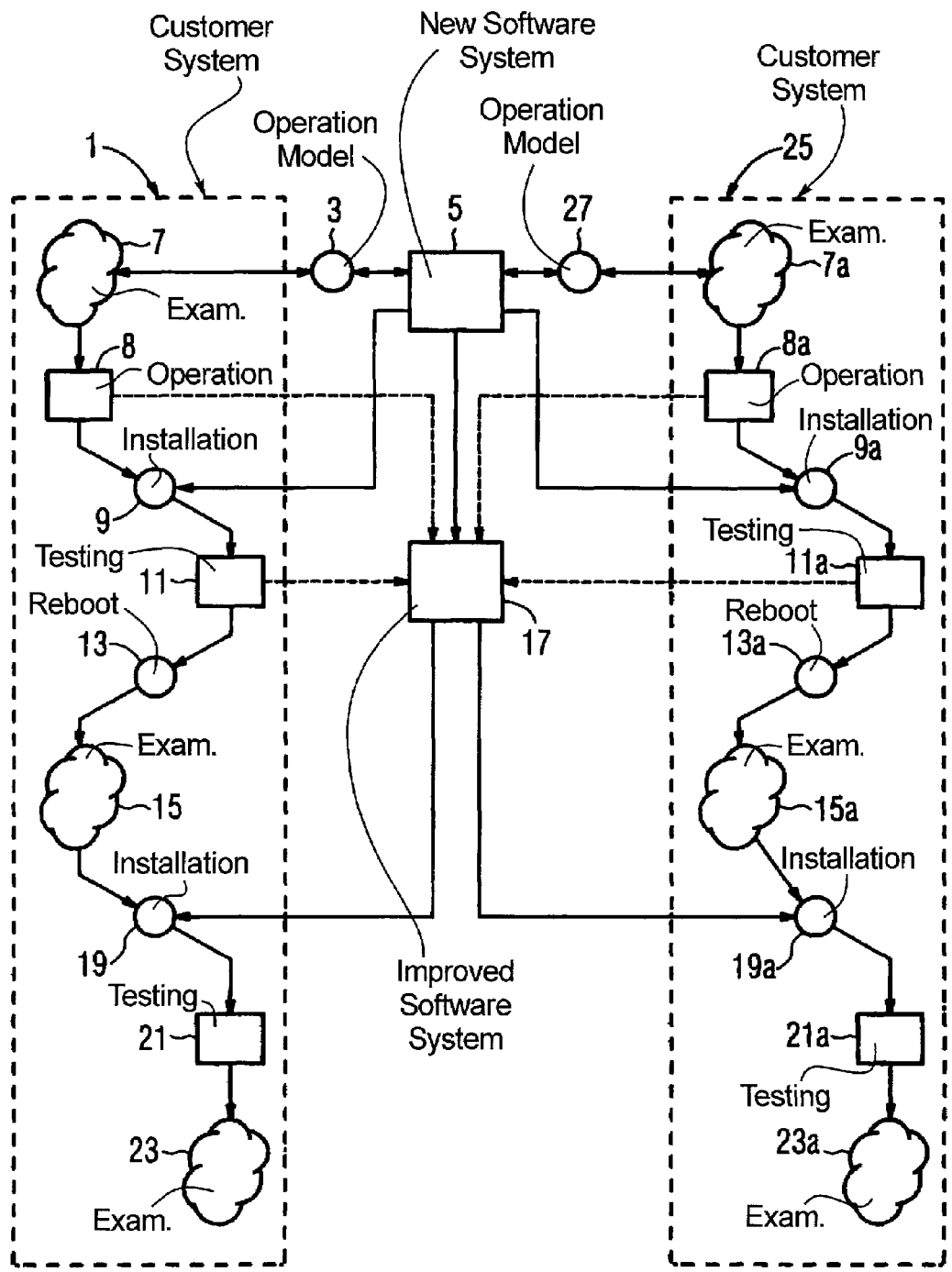

METHOD TO TEST A SOFTWARE SYSTEM FOR TECHNICAL SYSTEMS

BACKGROUND OF THE INVENTION

1. Field of the Invention The invention concerns a method for testing a software system that operates a technical system.

2. Description of the Prior Art

Software systems that operate technical systems have many different possible uses and modifications can be very complex with regard to their assembly and their functioning. Such complex software systems and testing of their enhancements is, for the most part, possible only with significant effort due to the manifold possibilities. For example, the time expenditure in testing software systems for magnetic resonance tomography devices can be on the order of a year. In spite of this expenditure, the danger exists that not all effects of a new software version are tested on the various technical systems. As a direct result of the time expenditure associated with the development of improvements of the software system, a complete testing can be implemented only with difficulty, such that undetected errors first reveal themselves with customers.

Typically, complex software systems are tested by the producer under as many individual conditions as possible, i.e. a test is implemented for each function. Boundary conditions in particular, because they are present in the operation of a technical system by a customer, cannot be considered. The test expenditure by the producer is very high, in particular with regard to personal and system costs, since the software system is simultaneously tested based on the manifold test functions on a number of technical systems. Many errors first reveal themselves after the general release and the delivery of the software systems to the customers. The problem in the development of complex software system is now that, due to the high-test expenditure, improvements/enhancements/upgrades can be passed to the customers only very slowly. Additionally, a high risk of failure and glitches exists in the operation of the technical system after a new installation of a software system.

A software update ensues for technical systems, for example for magnetic resonance tomography devices (MR devices), approximately annually, due to the complexity of the software, whereby the improvements of the software are collected and tested on technical systems of the producer.

A device as well as a method to initiate and/or diagnose control systems is described in German OS 101 25 384. A control system is a system that controls a machine with a suitable control program via a microcontroller. The device has a display device to display the functionality of the control system via an object model. The object model is an image of the functionality of the control system and includes, for example, technology objects such as positioning axes, and synchronization axes that can be combined with one another according to their functionality. Additionally, the device includes an engineering system with which the initiation, projecting, parameterization of controls, and actuations is possible, and/or with which the control program is generated on the basis of the functionality of the control system displayed via the object model.

SUMMARY OF THE INVENTION

An object of the present invention is to make the testing of a software system quickly and cost-effectively implementable.

This object is inventively achieved in a method to test a software system for operating a technical system, including a technical system that is in operation by a customer, wherein an operation model is generated that is based on a reproducible operating procedure under conditions relevant to the customer that monitors the operation of the technical system, wherein the software system to be tested on the technical system of the customer is installed, and wherein this technical system is operated and monitored with the operation model, and wherein the operation of the technical system of the customer with the operation model is evaluated with regard to possible incorrect executions.

The term "operation model" is used herein in the broadest sense with regard to monitoring the execution of the operation of the technical system. This includes the definition of the operation of the technical system, for example the retaining or copying of a typical operation procedure by the customer, or the repetition of this operation procedure at a later point in time. The monitoring of the operation procedure can also can include a test, for example by recording or evaluating the success of the operation procedure.

The method to test a software system has a number of advantages. The use of an operation model simplifies the comparison of the operation of an individual technical system with different software systems under standardized conditions. The standardized conditions can be adapted to fundamental and important operation models of the technical system corresponding to the customer. This has the further advantage that different tests are implemented by means of an operation model that together test the customer-specific requirements. By using the expensive technical systems of the customer in what is known as the shadow operation, i.e. outside of the times used in normal operation, the test can be implemented significantly more cost-effectively, since the expensive technical system no longer has to be made available by the producer for software development purposes.

In different embodiments the operation model can be specified in the form of a protocol input parameters, input data and/or boundary conditions of the technical system. This has the advantage that the testing can be implemented under reproducible conditions, since these are retained in the operation model.

In an embodiment, limit values are established in the operation model. This has the advantage that differentiation can be made between a proper execution and a faulty execution.

In another embodiment, the operation model is based on a reproducible measuring event. For example, such a measuring event can be implemented on a phantom that establishes the general framework of the measuring event. This improves the comparability of the operation procedures with different systems.

In another embodiment of the method, after the testing the originally installed software is reverted to. This has the advantage that, for the customer, nothing has changed in the operation with the originally installed software with regard to the functionality of the technical system. An installation of the software system ensues after a general release by the producer.

In a further embodiment of the method, feedback to the software developer ensues after the testing of the software system. This has the advantage that the software developer receives all information with regard to newly occurring errors or other parameters characteristic of the performance of the technical system such as, for example, response times or user specifications, and the developer can improve the software system after an analysis of the feedback.

DESCRIPTION OF THE DRAWINGS

The FIGURE is a flowchart of an exemplary embodiment of the inventive method.

DESCRIPTION OF THE PREFERRED EMBODIMENTS

An operation model 3 is generated at a customer system 1 for a typical operation segment of a magnetic resonance tomography device, for example a model for an entire day or for an individual patient. This is characterized by both input parameters such as input of a medical technical assistant operating the magnetic resonance device and other specifications (for example, patient data with consideration of the data protection) as well, are recorded. Furthermore, output data are retained by the operation model 3, for example error, process, or status records, as well as additional data such as, for example, the number of the exposures.

Limit values are optionally established in the operation model 3 which enable a differentiation between a proper procedure and a faulted procedure. Such a limit value can be tested by, for example, an error counter that records the degree of severity of ensuing errors or specific time constants such as, for example, the response times to user inputs, or the processing times of specific routines. The operation model 3 is characterized in all of its criteria by the specific boundary conditions of the customer system 1.

The operation model 3 also can be generated in narrow terms to develop a new software system 5.

The operation model 3 should ensure an outstanding reproducibility of a measuring event or an operation segment. This suggests the use of standardized operation or measurement procedures, for example the use of phantoms in magnetic resonance devices.

The testing of a software system 5 proceeds for example, as follows. The customer system 1 is configured with an original software with which the examinations 7 are implemented on the patient. In the next step, an operation 8 of the customer system 1 on which the original software is installed ensues on a phantom or examination subject according to the operation model 3. A first result of the operation 8 is transmitted to a software developer of the new software system 5 via e-mail.

The feedback result can include, for example, information with regard to errors that occurred or other parameters characteristic of the capability of the software, for example response times to user specifications.

In the next step, an installation 9 of the new software system 5 ensues by the software developer via the Internet to the customer system 1. This ensues in a rapidly reversible manner, such that it can be undone by the customer or by the software developer at any time, for example by booting the customer system 1 from two different hard drives.

In the next step, a test 11 of the customer system 1 ensues using the same operation model 3 and the same phantoms or examination subjects. A second result is again transmitted via e-mail and compared with the first result. It is thereby tested, for example, whether limit values were observed. If a substantial degradation in the operation of the customer system 1 with the software system 5 appears, for example an extension of time constants, additional error reports, or particularly severe errors, a reboot 13 of the customer system 1 thus rapidly ensues with the old software and examinations 15 are again implemented.

Using these results, an improved software system 17 is generated that is adapted to the customer system 1 in a further installation 19 via the Internet.

A test 21 of this improved version is newly implemented by means of the operation model 3. If all faults are repaired in a satisfactory manner, the customer system can now implement examinations 23 on patients with the improved software. If faults still ensue, at least one further test and improvement cycle is run.

The installation and testing of the new software system 5 can be implemented outside of the treatment times of patients, for example at night. For example, it can be implemented by clinical personnel in training or by means of a test software integrated into the software system. The test software, for example, first records and subsequently identically reproduces the inputs of an operator.

Means are available in modern magnetic resonance systems to enable blending of computer-aided paradigms for functional MR. Such means can be, for example, magnetic resonance device-compatible displays for the examination subjects to be examined, or input devices such as, for example, magnetic resonance device-compatible mice. These means can be used in order to generate an operation model in which the operator of the customer system 1 is also simultaneously the examination subject. In this operation model, the operator lying in the magnetic resonance device implements all steps established in the operation model him or herself, with any magnetic resonance measurements being implemented on him or her. This enables a cost-effective implementation of the method independent of further personnel.

The invention also enables a continuous development process by which improvements can be more quickly passed to the customer. This is enabled partly by the fact that customer systems are used for testing new software versions. The testing of software can ensue by the customer at virtually any time, specifically in consideration of the requirements of the customer regarding the system. The method can be implemented to test software on a number of selected technical systems that exist with customers with different operation models adapted to the respective customers. This significantly speeds the development, since it can ensue continuously.

To indicate the use of a number of customer systems, a further customer system 25 is indicated in the FIGURE for which an operation model 27 is likewise designed. In the development of the software system 5, results from the inclusion of further customer systems also can be emitted, for example by an operation 8*a* of the customer system 25 with the operation model 27 based on an original software, or via a testing 11*a* of the new software system 5 with the operation model 27. Examinations 7*a*, 15*a* on patients can be implemented by means of the appertaining original software until the improved software system 17 enables an error-free run of the examinations 23*a*. The changes 9*a*, 13*a*, 19*a* between the original software and the software system 5, 17 can likewise be initiated by the software developer via the Internet.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for testing a software system that operates a technical system, comprising the steps of:

operating a technical system with existing software installed at a medical facility to interact the technical system with patients of the medical facility for treatment or examination and, while said technical system is operated for said interaction with at least one of said patients of the medical facility, generating a computerized operation model that mimics a reproducible operation procedure that occurs during said interaction of said technical system with said at least one of said patients at said medical facility;

installing new software in said technical system of said medical facility for operating said technical system at said medical facility;

operating said technical system of said medical facility according to said operation model while using said new software system, during a non-normal usage time of non-interaction with patients of said medical facility, at said medical facility to obtain a test result for said software system; and evaluating said test result to detect errors in said operation of said technical system caused by said new software.

2. A method as claimed in claim 1 further comprising operating said technical system with said existing software system according to said operation model during said non-normal usage time to obtain baseline information, and using said baseline information in the evaluation of said test result.

3. A method as claimed in claim 1 comprising after operation and monitoring of said technical system of the medical facility according to said operation model during said non-normal usage time, reverting to said existing software to operate said technical system.

4. A method as claimed in claim 1 comprising, from said evaluation of the operation of the technical system of the medical facility with the operation model, generating feedback and providing said feedback to a software developer.

5. A method as claimed in claim 4 comprising analyzing said feedback and developing an improvement of said existing software system based on said feedback.

6. A method as claimed in claim 1 comprising in generating said operation model, documenting, as protocol, at least one of input parameters, input data and boundary conditions of said technical system of said medical facility.

7. A method as claimed in claim 6 comprising in generating said operation model, establishing limit values differentiating between error-free operation of said technical system and erroneous operation of said technical system.

8. A method as claimed in claim 6 comprising in generating said operation model, automatically implementing an operation procedure associated with said technical system, in addition to said documenting.

\* \* \* \* \*